J. A. LAWSON.
Ash Pan for Stoves.
No. 2,304.
Reissued July 10, 1866.
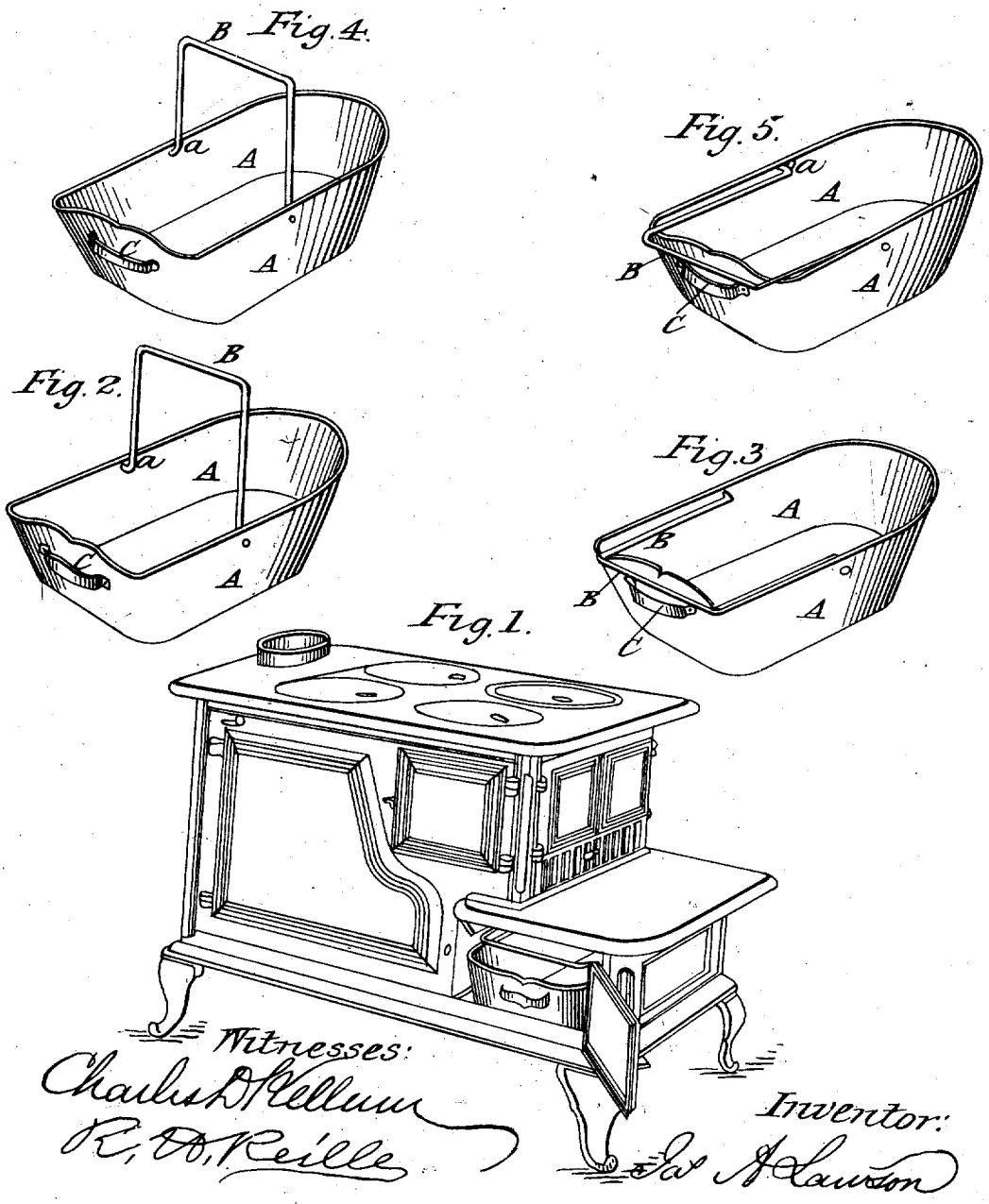
N. PETERS, Photo-Lithographer, Washington, D. C.

UNITED STATES PATENT OFFICE.

JAMES A. LAWSON, OF TROY, NEW YORK.

ASH-PAN DRAWER FOR STOVES.

Specification forming part of Letters Patent No. 38,902, dated June 16, 1863; antedated April 7, 1863; Reissue No. 2,304, dated July 10, 1866.

*To all whom it may concern:*

Be it known that I, JAMES A. LAWSON, of the city of Troy, county of Rensselaer, and State of New York, did, on the 16th day of June, A. D. 1863, obtain of and from the United States certain Letters Patent for and upon certain new and useful Improvements in Ash-Pan Drawers for Stoves, Furnaces, &c., which said Letters Patent have been duly surrendered for the purpose of reissue of the same upon a corrected and amended specification, as follows, to wit: I do thereby declare that the following is a full, clear, and exact description of the same, reference being hereby had to the accompanying drawings, and to the letters of reference marked thereon, which said drawings make a part of this specification.

Like letters represent and refer to like or corresponding parts.

Figure 1 is a perspective view of a cooking-stove, showing my said ash-pan drawer thereto applied and ready for use in the manner substantially as herein described and set forth. Fig. 2 shows my said ash-pan drawer with a bail attached thereto and combined therewith when in use removing the ashes, &c., from the stove, in the manner substantially as herein described and set forth. Fig. 3 shows the same ash-pan drawer represented by Fig. 2 with the bail thereof closed upon the upper portion of the said pan when in use in the stove to receive from the fire-grate or fire-chamber ashes, &c., in the manner substantially as herein described and set forth. Fig. 4 shows my said ash-pan drawer with bail thereto attached and with bail-stops cast upon the side of such pan, in the manner and for the purposes substantially as herein described and set forth; and this figure also shows such pan as in use removing ashes, &c., from the stove without the aid of coal-hod or other separate vessel. Fig. 5 shows the same ash-pan as in use in the stove to receive ashes, &c., from the fire-grate or fire-chamber, with the bail thereto attached closed upon the top of the said ash-pan drawer, in the manner substantially as herein described and set forth.

The nature of my said invention and improvements consists in the employment of an ash-pan drawer with a bail thereto attached and combined in such manner that when the said ash-pan drawer is drawn out from the chamber of the stove, which is connected with the fire-grate or fire-chamber, it may be removed, with contents therein, to any desirable place without the aid of coal-hod or other vessel, and such contents discharged therefrom, in the manner and by the means substantially as herein described and set forth.

It also consists in so attaching or combining a bail with the ash-pan drawer of any stove or furnace as to allow the same to be removed therefrom and carried to any place of deposit, whereby the ashes therein may be emptied therefrom by said bail and a handle or its equivalent upon the front end of said drawer, by means of which there will be no ashes or dust arising in the room where the stove or furnace is used, or any necessity for the use of or any change of said ashes into another vessel or means of conveyance before the same shall have reached the place of deposit for the same, substantially as herein described and set forth.

To enable others skilled in the art to which my said invention and improvements relate to make and use the same, I will here proceed to describe the construction and operation of the same, which is as follows, to wit: I make the pan A of cast or wrought iron, substantially as shown at Figs. 2, 3, 4, and 5, and of any size or capacity required or deemed sufficient. To such pan so constructed I attach or combine the bail B. (Shown at the same figures.) This bail is made of wrought-iron of the desired or required size, form, or shape, and is connected to and combined with such pan at or near the center thereof and near the upper edge of the respective sides thereof, substantially as shown at Figs. 2, 3, 4, and 5. Upon the inside of the said pan, and at or near the top thereof, I construct stops *a a*, Figs. 4 and 5, or such stops may be upon the outside of such pan, and said bail so constructed as to correspond thereto and operate therewith. These stops are placed at a short distance one side of the center point of the said ash-pan drawer, so that when the said bail B comes in conjunction therewith the said ash-pan shall equally balance, or nearly so, and always keep in a proper line or condition while being carried with ashes therein. These stops are back of the said center lines, so that by raising the front end of the said ash-pan drawer by the handle C or any equivalent thereof, Figs. 1, 2, 3, 4, and 5, the said pan will the more easily dump or be raised up sufficient to allow the ashes or other material therein to pass out therefrom at the back end thereof into the place of deposit. When the said ash-pan drawer is in the stove or furnace in use receiving ashes, &c., from the fire grate or chamber the said bail B will be in the position substantially as seen at Figs. 1, 3, and 5. In the front end of such ash-pan drawer there may be a recess of sufficient size to receive the said bail, while the same are in the stove in use as aforesaid. The said bail may project out or beyond the front end of the said ash-pan drawer, substantially as seen at Figs. 3 and 5, when said bail is closed in the manner and for the purposes as aforesaid, whereby the same will remain more remote from the heat from the fire grate or chamber, and consequently not as liable to become heated, it being desirable to keep such bail as cool as possible for use, if necessary, when the stove is highly heated, so that the same will always be in condition for the use intended. The handle C upon the front end of said ash-pan A may be made of cast or wrought iron, and secured thereto by means of rivets or other mechanical means which will answer the purpose required. It may be of any size or shape desired, or it may be cast with and upon the said drawer, if deemed best so to do. The said ash-pan drawer, it is manifest, may be drawn or removed from the stove or furnace, when used, by the said bail, while it remains in the position substantially as seen at Figs. 3 and 5.

I also construct my said ash-pan drawer without the said stops *a a*, described as aforesaid, and which may be seen at Figs. 2 and 3. The said ash-pan (shown at said Figs. 2 and 3) is in all respects substantially the same as that shown at Figs. 4 and 5, with the exception of the omission of the stops as aforesaid. In one case the said bail is free to act without the interposition of any stops, while in the other case it is acted upon by means of the aforesaid stops in the manner substantially as aforesaid. When the said ash-pan is in use in the stove or furnace it will be in the position substantially as shown at Fig. 1. It may be removed from the chamber wherein it is used by means of said bail or handle. And when in use for the purpose of removing the said ash-pan drawer from the room where the said stove or furnace is in use it will be in the position substantially as seen at Figs. 2 and 4, and the said ash-pan drawer will remain in position in relation thereto, substantially as seen at said Figs. 2 and 4. The said stops *a a* are designed to prevent the said ash-pan drawer from turning or dumping while being carried by the said bail, which, when used in connection with the said stops, is placed somewhat in front of the center line or point of the said ash-pan drawer, as aforesaid, whereby the same can be carried without any hinderance whatever. In the case where no stops are used the said bail will be set to or upon such center line, as near as may be, and the contents of said pan as nearly equally distributed as possible over the inner surface of the said pan for the purpose of carrying the same to the place of deposit, as aforesaid, without the said pan being turned or dumped in transit or before it is desirable so to do.

The general plan or feature of my said invention is the same in both cases aforesaid.

It will be seen that by my said invention the ashes or other material in the said ash-pan drawer may be removed from the stove or furnace and carried to the place of deposit without any changing of the same into other vessels for the removal of the same, and thereby preventing dust or dirt from entering the room from said ash-pan or stove used, and also economizing in time, labor, and saving the use of an extra vessel for the transportation of such ashes, &c., to the place of deposit, as aforesaid.

It will also be seen that this ash-pan or drawer is simple, cheap, and most convenient for the uses and purposes aforesaid.

Having thus described my said invention and improvements, what I claim and desire to secure by Letters Patent of the United States, is—

1. The ash-pan drawer A, for cooking or other stoves, or for furnaces, having the bail B and the handle C thereto attached, and arranged within an inclosed ash pit or chamber, and in combination with the fire-grate or fire-chamber thereof, in the manner and for the purposes substantially as herein described and set forth.

2. The arrangement of an ash-pan drawer, having the bail B combined therewith, within an inclosed ash-pit or ash-chamber of a stove or furnace, and in combination with the fire-grate or fire-chamber thereof, in such manner as to receive the ashes and other material falling therefrom, and thereafter be removed, in the manner substantially as herein described and set forth.

3. The employment of an ash-pan for cooking or other stoves or for furnaces, constructed in the manner substantially as herein shown and described, in combination with a surrounding or inclosed ash-chamber or ash-pit, so that no dust or other matter shall escape from or by reason of the falling of ashes or other material from the burning of fuel upon the fire-grate into the room where such stove or furnace is used, in the manner substantially as herein described and set forth.

4. The bail B, in combination with the ash-pan drawer A, and with the stops *a a* and handle C, in the manner substantially as and for the purposes herein described and set forth.

In testimony whereof I have, on this 6th day of November, A. D. 1865, hereunto set my hand.

JAS. A. LAWSON.

Witnesses:

CHARLES D. KELLUM,
R. H. REILLEY.